United States Patent [19]
Bullock et al.

[11] Patent Number: 5,149,606
[45] Date of Patent: Sep. 22, 1992

[54] METHOD OF TREATING A BATTERY ELECTRODE WITH PERSULFATE

[75] Inventors: Norma K. Bullock, Pewaukee; Ralph A. Petersen, West Allis, both of Wis.

[73] Assignee: Globe-Union Inc., Milwaukee, Wis.

[21] Appl. No.: 667,878

[22] Filed: Mar. 12, 1991

[51] Int. Cl.$^5$ ............................................. H01M 10/04
[52] U.S. Cl. ..................................... 429/228; 423/619
[58] Field of Search ................. 429/228, 205; 423/619, 423/98

[56] References Cited

U.S. PATENT DOCUMENTS

| | | | |
|---|---|---|---|
| 1,506,633 | 8/1924 | Grunbaum | 423/619 |
| 2,159,226 | 5/1939 | Reid . | |
| 2,658,097 | 11/1953 | Orsino . | |
| 2,853,362 | 9/1958 | Jaszka et al. | 423/619 X |
| 3,398,024 | 8/1968 | Barnes e al. . | |
| 3,959,453 | 5/1976 | Torikai et al. | 423/619 |
| 4,008,144 | 2/1977 | Torikai et al. | 204/290 R |
| 4,656,706 | 4/1987 | Mahato | 29/2 |

FOREIGN PATENT DOCUMENTS

| | | |
|---|---|---|
| 723018 | 10/1968 | Belgium . |
| 59-101773 | 6/1984 | Japan ................................. 429/22 B |
| 62-145664 | 6/1987 | Japan . |
| 8801559 | 5/1988 | Spain . |

*Primary Examiner*—Stephen Kalafut
*Attorney, Agent, or Firm*—Foley & Lardner

[57] ABSTRACT

Improved formation efficiencies for positive pasted plates used in lead-acid batteries are provided by treatment of the positive plates with a stabilized aqueous alkaline persulfate solution to effect the conversion of lead monoxide to lead dioxide. Use of the alkaline persulfate solution enhances both formation and initial performance of the fabricated batteries. A stabilizing agent is added to the alkaline persulfate solution to stabilize the lead sulfate and basic lead sulfates in the paste. A preferred method for producing positive plates of a lead-acid battery comprises the steps of (a) heating the pasted plate, (b) spray coating with or dipping the plate in a persulfate solution, and (c) reheating the plate to accelerate the reaction of lead monoxide with persulfate to form lead dioxide. The persulfate treatment may be applied to uncured pasted plates and used with plate paste containing free lead, and the spray-coating procedure offers an easy and efficient manufacturing step.

21 Claims, 1 Drawing Sheet

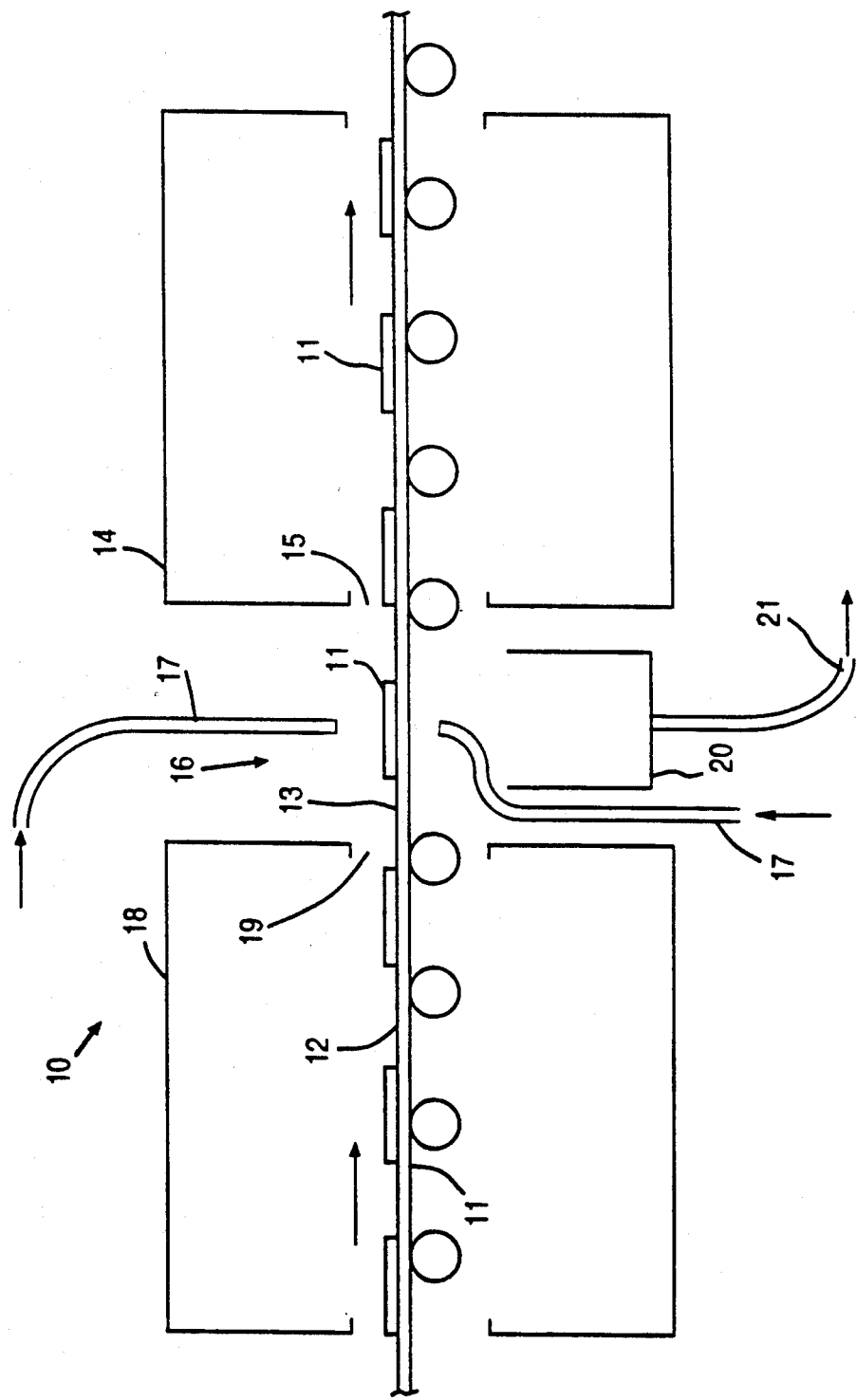

METHOD OF TREATING A BATTERY ELECTRODE WITH PERSULFATE

TECHNICAL FIELD

The present invention relates to the preparation of positive lead-acid battery electrodes, and, in particular, to a method for improving formation efficiencies of positive lead-acid battery plates.

BACKGROUND OF THE INVENTION

The formation efficiency of lead-acid batteries depends to a great extent on the positive plate, in particular, to the extent of conversion of lead monoxide (PbO) to lead dioxide ($PbO_2$) in the active positive material. Positive plates, which are pasted lead current collectors, are generally more difficult to form than negative plates. The high electrical potential required for formation appears to be related to the transformation of nonconductive paste materials to $PbO_2$. A low formation efficiency of positive plates requires a high formation charge.

Inefficient charging also leads to deficiencies in the resulting batteries assembled with such plates. Typically, the rated capacity (performance) of the battery is low, requiring additional cycling to reach specific performance values. The battery also tends to self-discharge even over relatively short periods of time.

A plate for a lead-acid battery may be prepared by preparing a paste mixture of lead oxide, sulfuric acid and water. The lead oxide reacts with the sulfuric acid to form mono-, di-, tri- or tetrabasic lead sulfate(s). Dry additives such as fiber and expander may be added. The plate is then applied to a lead grip. The pasted plates are next typically cured for many hours under elevated temperature and humidity to oxidize free lead (if any) and adjust the crystal structure of the plate, e.g., convert tribasic to tetrabasic lead sulfate. Depending on the mixing and curing procedures used, the lead paste elements typically consist of lead monoxide, lead hydroxide, tribasic lead sulfate and tetrabasic lead sulfate. The basic lead sulfates provide structure in the plate which is necessary for good battery performance.

After curing, the positive plates are assembled into batteries and electrochemically formed by passage of current to convert the lead sulfate or basic lead sulfate(s) to lead dioxide. Several attempts have been made to improve the conductivity of the paste and thus improve the formation efficiency. For example, it is known to apply a hydrogen peroxide solution to the surfaces of battery plates by painting, dipping or spraying. See Orsino U.S. Pat. No. 2,658,097 issued Nov. 3, 1953. Ozone has been used to treat battery plates, as described in Mahato U.S. Pat. No. 4,656,706, issued Apr. 14, 1987.

In particular, reacting a persulate ($S_2O_8^{2-}$), also known as peroxydisulfate or peroxodisulfate, with the pasted plate has been suggested. Persulfate reacts with lead monoxide and water to form lead dioxide. U.S. Pat. No. 2,159,226, issued May 23, 1939 to Reid, discloses the use of persulfate to improve the formation efficiency of lead battery plates. The plates are dipped into an ammonium persulfate solution, or in persulfate is added directly to the battery paste. The persulfate solution consists of ammonium persulfate in dilute sulfuric acid. According to Reid, the persulfate pickling bath need not be an acid solution, and the persulfate may be added to any desired pickling solution, such as neutral aqueous solutions of ammonium sulfate or sodium sulfate. Pickling generally refers to the process of forming lead sulfate(s) by the reaction of lead oxide with sulfuric acid. Since acid is commonly used for this purpose, a pickling bath is not alkaline.

Other variations of persulfate positive plate treatments have been proposed. Like the original Reid process, all of these include conducting the persulfate reaction in an acidic environment. For example, U.S. Pat. No. 3,398,024, issued Aug. 20, 1968 to Barnes and Armstrong, discloses a method for obtaining better adhesion of the paste to the lead grid by dipping the grid prior to pasting in a persulfate or perborate solution, and then pasting the grid while it is still wet. Belgian Patent No. 723,018, published Oct. 28, 1968, describes another variation of the persulfate process involving paste preparation by mixing lead oxide and a small amount potassium persulfate with water until the lead oxide is dispersed uniformly throughout the mixture, and then applying the paste mixture to an electrically conductive grid support, partially drying the plate, and then dipping it in sulfuric acid. Japanese Patent Publication No. 62-145664, published in 1985, describes a process of dipping pasted grids into an acidic ammonium persulfate solution. Spanish Patent Publication No. 8801559, published May 10, 1988, similarly discloses immersing pasted plates, prior to formation, in an acidic persulfate solution, or adding persulfate to the acid of the battery prior to formation.

As to known uses of alkaline persulfate solutions, such solutions have been used to deposit lead dioxide on ceramic substrates which are subsequently converted by electrodeposition to lead dioxide electrodes for use in electrolysis reactions. See, e.g., U.S. Pat. No. 4,008,144, issued Feb. 15, 1977 to Torikai et al., which discloses conversion of water-soluble lead salts deposited in a ceramic substrate to lead dioxide by dipping the substrate in alkaline persulfate solutions.

Neither the dipping method nor the addition of persulfate to the battery paste are effective if free lead is present in the paste, and for this reason neither method is effective for making uncured battery plates containing free lead. Thus, while the prior art has attempted to address the problem of positive plate formation inefficiency, the known persulfate methods have disadvantages.

Treatment with an aqueous alkaline persulfate solution to effect the conversion of lead monoxide to lead dioxide has been proposed as an alternative to process discussed in the foregoing patent to Reid conducted in a neutral or acidic environment. However, such an alkaline solution tends to convert lead sulfate and basic lead sulfates to lead oxide. Such lead sulfates are desirable paste components because they increase plate porosity and improve performance. The present invention addresses this problem and additionally provides a new method for application of a persulfate solution.

SUMMARY OF THE INVENTION

This invention provides improved formation efficiencies for positive electrodes used in lead-acid batteries, especially battery plates, by treatment with a stabilized aqueous alkaline persulfate solution to effect the conversion of lead monoxide to lead dioxide. Use of the alkaline persulfate solution enhances both formation and initial performance of the fabricated batteries. A stabilizing agent is added to the alkaline persulfate solution to stabilize the lead sulfate and basic lead sulfates in the paste. The stabilizing agent, preferably a sulfate salt, inhibits conversion of these lead sulfates to lead oxides by means of the common ion effect.

An additional feature of the invention is an improved method for applying a persulfate solution to a pasted plate. Such a method can include the steps of (a) heating the pasted plate, (b) spray coating with or dipping the plate in a persulfate solution (alkaline, acidic or otherwise), and (c) reheating the plate to accelerate the reaction of lead monoxide with persulfate to form lead dioxide.

An important advantage of the invention is that the persulfate treatment may be applied to uncured pasted plates and used with plate paste containing free lead. A further advantage of the invention is that the spray-coating procedure offers an easy and efficient manufacturing step and allows substantial cost savings by minimizing amounts of reagents needed to effect the persulfate reaction.

BRIEF DESCRIPTION OF THE DRAWING

The drawing is a schematic side view of an apparatus for carrying out the method of the invention.

DETAILED DESCRIPTION

The persulfate used in the method of the invention reacts with lead monoxide to form lead dioxide which enhances positive electrode formation. Such positive electrodes include both pasted positive plates, (lead alloy grids to which the paste is applied) or tubular electrodes wherein the paste is disposed in a tubular screen about a conductive spine. These and other forms of lead-acid battery electrodes are generally known in the art.

Contrary to the teachings of the prior art, it has been found that the reaction can be conducted in an alkaline solution. However, the alkaline environment tends to dissolve the lead sulfate and basic lead sulfate in the positive plate. Such decomposition hinders the formation process and is highly undesirable.

It has been found, according to the invention, that a stabilizing agent can be used to prevent conversion of basic lead sulfate(s) in the positive plates to lead oxide and hydroxide, thereby stabilizing such lead sulfates. In an unformed lead plate, the lead materials present are typically lead monoxide, lead hydroxide and basic lead sulfates, usually tri- or tetrabasic lead sulfate, or a mixture thereof. The stability of the basic lead sulfates increases as the amount of sulfate in the treatment solution increases due to the common ion effect. The stabilizing agent of the invention is any compound capable of producing a sulfate ion ($SO_4^{2-}$) in a basic persulfate solution preferably in a sufficient amount to suppress the reactions:

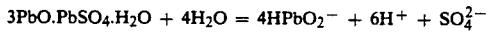

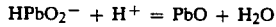

for conversion of tribasic lead sulfate to lead oxide, and the reactions:

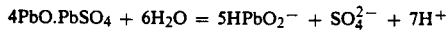

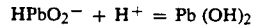

for the conversion of tetrabasic lead sulfate to lead hydroxide.

A preferred method for improving formation efficiency of positive plates for a lead-acid battery involves using an aqueous alkaline persulfate solution to convert lead monoxide to lead dioxide. The persulfate solution may be prepared by dissolving a persulfate salt, such as sodium persulfate, ammonium persulfate, lithium persulfate, or potassium persulfate, in an aqueous solution of a metal hydroxide such as potassium hydroxide or sodium hydroxide. The pH of the alkaline persulfate solution may be any pH greater than 7 (neutral). A buffer solution, such as a borate buffer, may be added to maintain the pH at the appropriate alkaline value.

A sulfate salt may be added to the solution as a stabilizing agent for the tribasic and tetrabasic lead sulfates present in the paste. The sulfate salt may be selected from the group including sulfates of lithium, potassium, sodium, calcium, strontium, barium, radium, lead, mercury, and silver, and combinations thereof, of which potassium sulfate and sodium sulfate are most preferred. In order to avoid problems with the solubility of sulfate salts, it is best to avoid the use of a common cation in the sulfate salt and the metal hydroxide used to make the solution. For example, it is preferred to use potassium sulfate as the stabilizer if sodium persulfate is present, or the reverse potassium persulfate/sodium sulphate combination.

The rate of the persulfate reaction is enhanced by heat. For this purpose, the plate may be heated prior to persulfate treatment, after the treatment, or preferably both. Heating of the plates may be accomplished by flash drying, e.g., using an open gas flame or an oven. A 10-15 second pre-and post-flash drying of the plates in a conventional flash drying oven at 260° C. (500° F.) is suitable. In the alternative, the plate may be heated in a conventional oven for at least about 30 minutes at a temperature in the range of 40° to 150° C.

The alkaline persulfate solution treatment may be effected in several ways. Cured or uncured pasted or tubular plates may be dipped in an excess amount of the alkaline persulfate solution containing the sulfate salt. Dip treating positive plates in, for example, pH 13 persulfate solutions containing 0.01M $K_2SO_4$, is a cost effective way of enhancing formation efficiency if heat treatments are used to promote the creation of significant levels of $PbO_2$. However, perhaps an even more convenient and cost-effective means of treating such freshly pasted positive plates is spray-coating the persulfate solution. However, perhaps because of a lack of excess persulfate solution, spray-coat persulfate treated plates are even more dependent on heat treatments to promote the formation of $PbO_2$ than dip treated plates.

Spray-coated, alkaline persulfate treated positive plates which contain leady oxide preferably undergo both a pre-heat treatment and a post-heat treatment step, each at a temperature of at least 40° C., in order to sufficiently promote the persulfate reaction. Visual inspection of plates which did not receive both heat treatments showed very little $PbO_2$ conversion (as would be evident due to visible darkening). However, a 30 minute pre-heat treatment at 100° C. prior to the persulfate spray-coating, followed by a 10 minute, 100° C. post-heat treatment, yielded good $PbO_2$ conversions, i.e., plates containing 1.5-2.5% by weight $PbO_2$. Thus, a preferred alternative is to spray the plate with the alkaline persulfate, generally in an amount in the range of about 0.001 to 1, preferably 0.1 to 0.4 g solution per gram (g) of paste material.

Heating the plate before and after spraying increases the rate of the persulfate reaction with lead oxide and thereby improves formation efficiency. The spray coating method has the additional advantage of minimizing the amount of persulfate which must be used, and provides an easier manufacturing step than dipping. It is also possible to incorporate the spray coating step in a conventional flash drying operation following pasting.

The drawing illustrates an apparatus 10 which can be used to carry out the method of the invention. A series of freshly pasted lead plates 11 are transported on a conveyer 12 having a perforate belt 13. Each plate 11 is preheated during passage through a first flash drying oven 14. Plates 11 then emerge one-by-one from the exit 15 of oven 14 and pass through the spraying zone 16, where each plate is sprayed with the stabilized persulfate solution by a pair of intermittently-operating spray nozzles 17 positioned above and below belt 13. If plates 11 are transported in side-by-side, connected pairs, dual nozzles 17 may be employed on each side of belt 13, one for each plate. Nozzles 17 are connected to a source of the pressurized persulfate solution (not shown). A collector 20 may be positioned below zone 16 to catch excess persulfate solution and transport it via a return line 21 to its source.

After spraying, plates 11 are transported into a second flash drying oven 18 through its entrance 19. Oven 18 may be substantially identical to oven 14. The length of ovens 14, 18 is determined so that a suitable residence time will be obtained for the desired rate of travel of conveyer 12. The treated plates 11 emerge from oven 18 ready for furthering processing, for example, curing and subsequent forming operations.

The concentration of the persulfate, the stabilizing sulfate salt, and the base hydroxide compound may vary widely depending on the reaction conditions, and may be determined for specific applications through experimentation. In general, the treatment solution will contain about 1-65% by weight of the persulfate, 0.00005 to 14 wt. % of the hydroxide compound (corresponding to a pH range of about 9-14.4), optionally up to 30 wt. %, especially 0.0001 to 26 wt. % of the sulfate salt, the balance being water and small amounts of impurities or other ingredients, such as up to about 1 wt. % of a buffer, which do not change the essential properties of the solution.

As is well known, pH changes rapidly with small changes in hydroxide concentration around pH 7. For example, a pH of 13 corresponds to 0.1 molar KOH concentration, a pH of 12 corresponds to a 0.01 molar KOH concentration, and so on. A pH of about 9 or higher for the persulfate solution is preferred for several reasons. First, at values below 9, the concentration of the base (NaOH, KOH) is very low and difficult to control. Second, lead monoxide and lead hydroxide tend to dissolve at pH values of about 9 or less, reducing the efficiency of the persulfate reactions and altering the plate composition.

The minimum pH which should be used is preferably about 9. The equilibrium pH for a pasted plate in water is about this pH. The minimum solubility for lead monoxide or lead hydroxide in aqueous solution is at pH 9.3. At lower pH values, these materials tend to dissolve and form other lead salts, such as lead sulfate or monobasic lead sulfate.

Maximum pH will depend on the composition of the plate and the maximum solubility of the sulfate salt used as the stabilizer. A tetrabasic lead sulfate plate should require a lower pH than a tribasic lead sulfate plate because at higher pH values, e.g., 13 or higher, a very large amount of the sulfate salt, i.e., exceeding the solubility limit, would be needed to stabilize the tetrabasic lead sulfate, whereas a much smaller amount would be needed to stabilize tribasic lead sulfate at pH 13. Thus, for positive plates wherein tetrabasic lead sulfate is a major component, the solution preferably has a pH in the range of about 9 to 12, especially 9.3 to 11.4. For tribasic lead sulfate, by contrast, a wider range of from 9-14.4 pH can be employed.

The sulfate salt stabilizes basic lead sulfates in the paste by minimizing their solubilities compared to the solubilities of lead monoxide and lead hydroxide. The basic lead sulfates provide the structure in the plate which is necessary for good battery performance. In an unformed pasted plate, the lead materials present are typically lead monoxide, lead hydroxide and either tribasic lead sulfate or tetrabasic lead sulfate or mixtures of these basic lead sulfates, depending on the mixing and curing processes used in plate production. The solubility of the basic lead sulfates decreases as the amount of sulfate in the treatment solution increases due to the common ion effect.

As an additional ingredient, a buffer may be added to control the pH. For example, up to about 1 wt. % of a borax buffer of the formula $Na_2B_4O_7 \cdot 1H_2O$ may be added. Depending on the amount used, the pH of the solution may be adjusted to a desired value in the range of 9.2 to 10.8 using such a borax buffer.

Liner papers are conventionally used on the surfaces of freshly pasted plates to facilitate handling and stacking. According to a further embodiment of the invention, sheets of liner paper are wetted with a persulfate solution according to the invention and then placed on opposite sides of a pasted positive plate, optionally with pre-or post-heating, to carry out the persulfate reaction.

The following examples detail the method according to the invention and are meant as illustrative and not limiting in scope of the invention.

In these examples, cells were assembled from positive plates made in accordance with the method of the invention and tested for formation efficiency. The formation efficiencies of such plates can be determined in three ways. First, the total percentage of $PbO_2$ can be determined; the higher the percentage of $PbO_2$, the more efficient is formation. The amount of $PbO_2$ produced in a positive plate during the formation process is determined by classic wet-chemical analysis and divided by the theoretical amount of $PbO_2$ which would have been produced if formation had been complete to determine the percent $PbO_2$ formed. Second, the discharge capacity per unit weight of active material can be determined; the higher the ampere-hour (AH/lb) of positive active material, the more efficient is formation. The discharge capacity of the plate is determined by measuring the discharge capacity in ampere-hours and dividing by the weight of positive active material in the cell. Third, the specific gravity of the acid can be measured at the end of the formation. The higher the specific gravity, the more complete is the formation.

EXAMPLE 1

A series of pasted positive plates were prepared by applying an uncured positive paste mixture to a conventional lead-antimony alloy grid. The composition of the paste was, in percent by weight:

56% lead oxide (PbO)
18% free lead (Pb)
14% lead sulfate (PbSO$_4$)
12% water

The pasted plates had dimensions of 14.5×13.6×0.18 cm and dry paste weights of 109 g were preheated at 100° C. for about 30 minutes. Prior to curing, the plates were sprayed with an aqueous solution containing 2M Na$_2$S$_2$O$_8$, 0.01M K$_2$SO$_4$, and 0.1M KOH of pH 13 and then reheated at 100° C. for 1-2 minutes. These plates, along with plates made at the same time but left untreated, were then cured by storing them at 95% relative humidity and 49° C. for 48 hours, followed by 48 hours at room temperature.

Lead-acid cells containing 7 positive and 8 negative plates were built using the treated positive plates and formed at 25.3 amp/lb positive active material for 5 hours followed by 11.5 amp/lb positive active material for 3.3 hours. Cells were tested by discharging at a constant current of 25 amperes to measure the reserve capacity. The reserve capacity obtained on the first discharge after formation was 41.9±1.0 AH/lb. positive active material. Control lead-acid cells which were identical to the test cells except that such cells contained untreated positive plates gave first reserve discharge capacities of 34.5±0.9 AH/lb positive active material.

EXAMPLE 2

The plates used in this example were made from a paste containing tetrabasic lead sulfate and orthorhombic lead oxide (o-PbO), which is a particularly difficult paste to form. Pasted positive plates of dimensions 14.4×12.5×0.17 cm were prepared using a paste made by mixing 60 weight % tetrabasic lead sulfate and 40 weight % o-PbO with less than 0.1 wt. % free lead content, and adding water to a wet density in the range of 3.8 to 4.1 g/cc. This paste composition had a total sulfate level of 15 wt. %. The plates were hand-pasted and had a dry paste weight of 85 g.

Prior to curing, some of the plates were spray-coated with the alkaline persulfate/sulfate solution containing 2M Na$_2$S$_2$O$_8$, 0.1M KOH and 0.01M K$_2$SO$_4$ of pH 13 with the same pre-heat and post-heat treatment as described in Example 1, while other plates were exposed to oxygen containing 6 wt. % ozone gas for 19 minutes, equivalent to 1.25 g ozone per plate. All of the plates were then cured by storage for 48 hours at 95% relative humidity and 49° C., followed by 48 hours at room temperature.

Lead-acid cells containing 7 positive plates and 8 negative plates were assembled from both types of plates and filled with 800 ml of 1.245 specific gravity aqueous sulfuric acid. Following formation by the same procedure described in Example 1, the plates were taken from the cells and were used to construct cells with 1 positive and 2 negative plates each. These cells were tested by discharging at a constant current of 4.16 amps (reserve capacity test), followed by a recharge. The cells were then discharged at −18° C. (0° F.) at 87.5 amps to determine the time to a 1.2 volts (V) cutoff (cold crank test). Samples of both types of the formed positive plates were also analyzed by wet chemical methods to determine their PbO$_2$ content.

The plates treated by spray coating with the alkaline persulfate/sulfate salt solution had a formed PbO$_2$ content of 78.3%, a first reserve discharge capacity of 46.3±2.0 AH/lb positive active material, and a cold crank of 65±5 sec to 1.2 V. The plates treated with ozone had a formed PbO$_2$ content of 56.6%, a first reserve discharge capacity of 34.0±0.0 AH/lb positive active material, and a cold crank of 54±4 sec to 1.2 V. Plates made from tetrabasic lead sulfate typically warp during the formation process, but it was observed that the plates treated with the persulfate solution warped less than the plates treated with ozone.

EXAMPLE 3

In this example, plates were made from leady oxides and contained either tetrabasic or tribasic lead sulfates. Pastes made of tetrabasic lead sulfate yield better battery performance than pastes made of tribasic lead sulfate, but are more difficult to form.

Slurry-prepared tetrabasic lead sulfate pastes were prepared using either Barton pot or ball mill leady oxide starting materials. The tetrabasic lead sulfate pastes were prepared by slowly adding 1.325 specific gravity sulfuric acid to aqueous slurries of oxides heated to 95° C. to achieve a total sulfate level of 15 wt. %. Excess water was removed from the slurry by vacuum filtration. The filtration time was adjusted to obtain the desired wet paste densities in the range of 3.8 to 4.1 g/cc. The plates, which were hand pasted, were the same size and paste weight as those described in Example 1.

Slurry-prepared tribasic lead sulfate pastes were prepared from ball mill oxide starting materials. The tribasic lead sulfate pastes were made by slowly adding 1.325 specific gravity sulfuric acid to aqueous slurries of lead oxide at room temperature to achieve a total sulfate level of 15 wt. %. The rest of the plate preparation was the same as described above for the tetrabasic lead sulfate paste.

Prior to curing, some plates were heated at 100° C. for 45 minutes, spray-coated with an alkaline persulfate solution as described in Example 1 and then heated again for 10 min. at 100° C. After treatment, the treated plates as well as untreated plates were cured and high-rate formed by the same procedures as in Example 2. Formation efficiencies were determined using the same reserve capacity and cold crank tests as described in Example 2. PbO$_2$ content of the plates was also determined.

The untreated plates made from tetrabasic lead sulfate and ball mill leady oxide had a PbO$_2$ content of 45.2%, a first reserve discharge capacity of 30.0±2.6 AH/lb positive active material and a cold crank of 54±5 sec. Plates made from tetrabasic lead sulfate and ball mill leady oxide but spray-coated with the alkaline persulfate/sulfate salt solution had a PbO$_2$ content of 60.2%, a first reserve discharge capacity of 50.3±2.7 AH/lb, and a cold crank of 91±6 sec. Spray-coated plates made from tetrabasic lead sulfate and Barton pot leady oxide had a PbO$_2$ content of 70.49%, a first reserve discharged capacity of 50.8±0.2 AH/lb. positive active material and a cold crank of 99±1 sec. The untreated plates made from tribasic lead sulfate and ball mill leady oxide had a PbO$_2$ content of 79.8%, a first reserve discharge capacity of 44.3±4.0 AH/lb positive active material and a cold crank of 70±3 sec. Spray-coated plates of tribasic lead sulfate and ball mill leady oxide had a PbO$_2$ content of 85.6%, a first reserve discharge capacity of 48.3±2.2 AH/lb. positive active material and a cold crank of 70±5 sec.

The results of Examples 1-3 are summarized in Table 1, which indicates the discharge capacity per pound of active material:

TABLE 1

| Plate Paste Used | Discharge Capacity (AH/lb) | |
|---|---|---|
| | Treated[a] | Untreated |
| Standard paste | 41.9 ± 1.0 | 34.5 ± 0.0 |
| 60% tetrabasic lead sulfate, 40% o-lead oxide | 46.3 ± 2.0 | 34.0 ± 0.00[b] |
| Barton pot leady oxide, tetrabasic lead sulfate | 50.8 ± 0.2 | |
| Ball mill leady oxide, tetrabasic lead sulfate | 50.3 ± 2.27 | 30.0 ± 2.6 |
| Ball mill leady oxide, tribasic lead sulfate | 48.3 ± 2.2 | 44.3 ± 4.0 |

[a]Spray coated with alkaline persulfate/sulfate solution with pre- and post- heat treatment.
[b]Untreated with persulfate, but exposed to ozone.

EXAMPLE 4

Plates were made of the same dimensions and composition as in Example 2, except that the lead oxide was a ball mill leady oxide, as in Example 3, instead of o-PbO with low free lead content. The plates were treated by dipping for 2 minutes in an alkaline persulfate solution containing 2M $Na_2S_2O_8$ and 0.1M KOH of pH 13, but no $K_2SO_4$. The plates were then cured, formed and tested as described in Example 1.

The plates treated by dipping in the alkaline persulfate solution had a first reserve discharge capacity of 39.8±0.6 AH/lb. positive active material. This compares to 50.3±2.7 AH/lb. positive active material for the plates treated by spray coating with the alkaline persulfate/sulfate salt solution and 30.0±6 AH/lb positive active material for untreated plates, all of which were made of tetrabasic lead sulfate and ball mill leady oxide, as described in Example 3.

These results can also be compared to the results given in Example 2 for plates of the same type except for the lead oxide used. In Example 2, the plates were made from tetrabasic lead sulfate and orthorhombic lead oxide by the same procedure as in this example. The latter (o-PbO) is known to be harder to form than the leady ball mill oxide used in the plates of this example. The plates in Example 2 which were treated by spray coating with an alkaline persulfate/sulfate salt solution had a higher reserve capacity than the plates of this example, which were dipped in the alkaline persulfate solution without the sulfate salt, namely 46.3±2 AH/lb positive active material (Example 2) compared to 39.8±0.6 AH/lb positive active material (Example 4).

EXAMPLE 5

In this example, alkaline persulfate/sulfate treatment of plates was used to improve the formation of a recombinant lead-acid battery. Batteries of this type are known to be particularly hard to form. Pasted positive plates were prepared from 0.09 inch thick lead grids and had dimensions of 6.125 inches width by 6.295 inches height by 0.1 inch thickness. The plates were treated for 1 minute by dipping in a persulfate solution containing 2M $Na_2S_2O_8$, 0.1M KOH, and 0.01M $K_2SO_4$. Analysis of one treated plate showed that it contained about 0.53 wt. % $PbO_2$. About 5% of the total $PbO_2$ present in the analyzed plate was lost when it was washed, indicating that this amount of material does not adhere well and may shed from the plates used in the test when the battery is filled with acid.

The treated and untreated plates were used to construct treated batteries having absorptive glass mat separators, limited electrolyte volumes and high-density pasted plates. These batteries were sealed with a one-way pressure relief vent. The batteries were filled with 950 grams of 1.240 specific gravity sulfuric acid which had been chilled to −9.4° C. (15° F.). The batteries were formed at 200 AH/lb positive active material using the following formation schedule: 3 hours at 0 A, 6 hours at 5 A, 36 hours at 8 A, 4 hours at 0 A, and 27 hours at 5 A. The peak temperature during the 3-day formation was 65.6° C. (150° F.) at the end of the 8 A 36-hour step for both treated and control batteries.

Capacities of the persulfate-treated and control batteries utilizing untreated plates were determined by discharging each battery 3 times at 295 watts/cell to 1.67 V with a recharge after each test. The batteries with plates treated according to the invention discharged 10-11 minutes, whereas the batteries with untreated plates discharged only 6-7 minutes during the 3 discharge tests. For the battery with persulfate-treated plates, the specific gravity at the end of formation was 1.286, compared to 1.276 for the control. The higher specific gravity value for the batteries according to the invention indicated more complete positive plate formation.

EXAMPLE 6

Effectiveness of the dipping method for applying the alkaline persulfate/sulfate solution was tested and the amount of $PbO_2$ produced was calculated. Freshly pasted positive plates, which had just been flash dried at 260° C. for 10 sec, were dipped in a 2M $Na_2S_2O_8$, 0.01M $K_2SO_4$ solution of pH 13 for 2 minutes. The plates were still very warm from the flash drying and visually darkened after the 2 minute dip treatment. The $PbO_2$ content of these plates was found to be about 2.3% by weight regardless of whether or not the plates received a post-heat treatment. $PbO_2$ levels equal to or greater than about 2% by weight usually indicate suitably rapid and efficient persulfate reaction. Thus flash drying just prior to dipping may suitably enhance the persulfate reaction when using the dipping method.

Untreated plates from this same batch were allowed to cool at room temperature for 2-3 hours, and were dipped in the same alkaline persulfate/sulfate solution for 2 minutes. These plates showed very little conversion to $PbO_2$ during the 2 minute dip treatment. analysis of these plates showed $PbO_2$ levels of only 0.1% by weight. These plates were then given a 15 minute post-heat treatment in a 100° C. oven. The $PbO_2$ level in these plates increased to 1.1%. Thus, flash drying just after dipping can also enhance the persulfate reaction when using the dipping method, although not as effectively as flash drying prior to dipping.

EXAMPLE 7

A comparison of $PbO_2$ produced in the positive plates used in Example 6 by the dipping method with $PbO_2$ produced by the spray-coat method, using the same alkaline persulfate/sulfate solution as in Example 6, was performed. The plates were given a 30 minute preheat treatment at 100° C. prior to spraying. The plates were then spray-coated, followed by a 10 minute post-heat treatment at 100° C. Analysis of these plates yielded PbO$_2$ levels of between 1.5% and 2.5% by weight.

The following comparative examples test neutral persulfate solution treatment as described in the prior art.

COMPARATIVE EXAMPLE 1

Pasted positive plates were made as described in Example 1 having a dry paste weight of 61 g/plate. These plates were cured by storing for 1½ to 2 hours in a steam chamber at atmospheric pressure and 100° C., followed by 48 hours at 95% humidity and 49° C., followed by 48 hours at room temperature. Plates cured in this manner are known to be particularly difficult to form because such plates contain large tetrabasic lead sulfate crystals.

After curing, some plates were dipped for 2 minutes in a 2M Na$_2$S$_2$O$_8$ aqueous solution at room temperature. These plates were then placed in an oven at 100° C. for 30 min. prior to assembly in cells with 6 positive and negative plates each. The color of the plates became darker after 5 minutes in the oven. Two cells of each type of plate, treated and untreated, were filled with 700 ml of 1.245 specific gravity sulfuric acid. These cells were then formed by charging for 5 hours at 24.13 amp and then 3.5 hours at 10.9 amp for a total of 165 AH/lb positive active material.

Tests to determine the average reserve capacity of the cells in a 25 amp discharge showed an initial discharge capacity of 37.7±1.3 AH/lb positive active material for the treated plates, and 30.8±0.5 AH/lb positive active material for the untreated plates. Neither type of cell was fully formed, since the specification for these cells is 45.7 AH/lb positive active material, but the cells with treated plates were more fully formed than the control cells.

COMPARATIVE EXAMPLE 2

Three pasted positive plates were made from Barton pot leady oxide and flash dried at 260° C. (500° F.) for 8-10 sec. The plates had the dimensions 12.6×12.6×0.16 cm and dry paste weights of 72 g. The initial free lead content of the pasted plates was 20 wt. %.

One plate, which was not cured, was dipped for 2 minutes in a 2M Na$_2$S$_2$O$_8$ aqueous solution and was then placed in an oven at 100° C. for 30 minutes. The final free lead content of the paste of this plate was 12.4%. The conversion of pasted plates made of leady oxide to lead dioxide was determined by observing the change in color of the plate from the grey-yellow color of the leady oxide to the dark brown color of lead dioxide. The plate did not change color and the amount of PbO$_2$ formed was determined to be only 0.25%.

A second plate was cured prior to treatment with the persulfate to reduce its free lead content to less than 3 wt. %. After being treated with persulfate and heated in the same way as the first plate, this cured plate changed to a dark brown color and had a PbO$_2$ content of 4.6%.

A third plate was not cured or treated with persulfate, but was dried in an oven at 100° C. for 30 minutes. This plate had a free lead content of 12.8%, nearly identical to the plate treated with persulfate, but did not contain PbO$_2$. This showed that free lead in the oxide inhibits the reaction of the neutral persulfate solution with the lead monoxide to form lead dioxide. It also demonstrates that the neutral persulfate solution does not oxidize the free lead. Thus, an additional advantage of the method of the invention is that it can be used on pasted plates containing free lead.

Modifications may be made in the method according to the invention without departing from the scope of the invention as expressed in the appended claims.

We claim:

1. In a method for converting lead monoxide to lead dioxide an uncured positive electrode for use in a lead-acid battery, which electrode includes a conductive support and a positive lead-acid battery paste, including the step of reacting lead monoxide in the past of the electrode with an alkaline solution of a persulfate salt under conditions effective to form lead dioxide in said paste, the improvement wherein the persulfate solution further contains a stabilizing agent in an amount effective to stabilize lead sulfates of the paste in the alkaline persulfate solution.

2. The method of claim 1, wherein said electrode comprises a pasted lead-acid battery plate.

3. The method of claim 1, wherein said electrode comprises a tubular electrode.

4. The method of claim 1, wherein the persulfate salt is selected from a group consisting of sodium persulfate, potassium persulfate, and ammonium persulfate.

5. The method of claim 1, wherein the alkalinity of the persulfate solution is between about pH 9 to 13.

6. The method of claim 1, wherein the stabilizing agent comprises a sulfate salt.

7. The method of claim 6, wherein the sulfate salt is selected from a group consisting of lithium sulfate, potassium sulfate, sodium sulfate, calcium sulfate, strontium sulfate, barium sulfate, lead sulfate, mercury sulfate, and silver sulfate.

8. The method of claim 5, wherein the solution contains a hydroxide in an amount effective to maintain said alkalinity.

9. The method of claim 5, wherein the solution further contains an amount of a buffer effective to maintain said alkalinity.

10. The method of claim 2, wherein the reacting step comprises dipping the plate in the alkaline persulfate solution.

11. The method of claim 2, further comprising the step of heating the pasted plate prior to reacting the plate with the persulfate solution.

12. The method of claim 7, wherein said sulfate salt has a different cation from the persulfate salt.

13. The method of claim 11, wherein the paste contains at least 3 wt. % of free lead.

14. A method for converting lead monoxide to lead dioxide in an uncured positive plate for a lead-acid battery, comprising the steps of:

heating the plate to a temperature sufficient to promote a reaction between persulfate and lead oxide; and spraying the surface of the plate with a persulfate solution.

15. The method of claim 14, wherein the heating step precedes the spraying step.

16. The method of claim 14, further comprising a second heating step following the spraying step.

17. The method of claim 16, comprising the steps of:

heating the plate to a temperature of at least about 40° C.;

then spraying the plate with an alkaline solution having a pH of between about 9 to 13 comprising 1 to 65 wt. % of a persulfate salt and 0.0001 to 26 wt. % of a sulfate salt;

then reheating the plate to a temperature of at least about 40° C.

18. A method for producing a positive lead-acid battery plate, comprising the steps of:
(a) pasting a lead grid to form an uncured positive battery plate;
(b) heating the plate to a temperature of at least about 40° C.;
(c) reacting lead monoxide in the plate with an alkaline solution containing 1 to 65 wt. % of a persulfate salt and 0.0001 to 26 wt. % of a sulfate salt to convert lead monoxide in the plate to lead dioxide;
(d) curing the plate; and
(e) electrochemically forming the plate.

19. A positive lead-acid battery plate treated by the method of claim 1.

20. A positive lead-acid battery plate treated by the method of claim 14.

21. A composition useful in the treatment of lead-acid battery plates, consisting essentially of an aqueous solution containing a persulfate salt in a amount of about 1 to 65 wt. %, a sulfate salt in an amount of 0.0001 to 26 wt. %, and a base in an amount effective to provide a pH for the solution greater than 7.

* * * * *